(12) United States Patent
Armstrong (10) Patent No.: US 7,796,898 B2
(45) Date of Patent: Sep. 14, 2010

(54) METHODS AND APPARATUS FOR GENERATION AND TRANSMISSION OF OPTICAL SIGNALS

(75) Inventor: Jean Armstrong, North Balwyn (AU)

(73) Assignee: Ofidium Pty Ltd., Melbourne (AU)

( * ) Notice: Subject to any disclaimer, the term of this patent is extended or adjusted under 35 U.S.C. 154(b) by 0 days.

(21) Appl. No.: 12/445,348

(22) PCT Filed: Jan. 29, 2008

(86) PCT No.: PCT/AU2008/000094

§ 371 (c)(1), (2), (4) Date: Sep. 17, 2009

(87) PCT Pub. No.: WO2008/092193

PCT Pub. Date: Aug. 7, 2008

(65) Prior Publication Data

US 2010/0034542 A1 Feb. 11, 2010

(30) Foreign Application Priority Data

Jan. 29, 2007 (AU) .............................. 2007900407

(51) Int. Cl.
*H04B 10/04* (2006.01)
(52) U.S. Cl. ...................... 398/193; 398/158; 398/159; 398/183; 398/136; 398/194; 330/149; 327/133; 327/551; 375/260; 375/296
(58) Field of Classification Search ................. 398/192, 398/193, 194, 195, 183, 182, 202, 208, 209, 398/147, 158, 159, 81, 79, 91, 141, 135, 398/136, 214; 330/149; 327/133, 551, 317, 327/355, 362; 375/260, 296
See application file for complete search history.

(56) References Cited

U.S. PATENT DOCUMENTS 5,060,310 A * 10/1991 Frisch et al. ................. 398/193

(Continued)

FOREIGN PATENT DOCUMENTS

WO WO 2007/025346 A1 3/2007

(Continued)

OTHER PUBLICATIONS

Djordjevic, I.V. et al., "LDPC-coded OFDM in fiber-optics communication systems [Invited]," Journal of Optical Networking, Mar. 2008, 7(3), 217-226.

(Continued)

*Primary Examiner*—Hanh Phan
(74) *Attorney, Agent, or Firm*—Woodcock Washburn LLP (57) ABSTRACT

Methods and apparatus (100) for composing, generating and transmitting information-bearing optical signals are provided. An information-bearing electrical signal is composed (108) having desirable spectral properties, preferably configured to ensure that undesired interference between electrical spectral components generated in a square-law direct detection process (120) at a corresponding optical receiver (104) is substantially avoided. Predistortion (110) is advantageously applied to transmitted signals, in order to account for a non-linear relationship arising in a modulation process (114) between electrical signal amplitude and corresponding optical field amplitude. Orthogonal frequency division multiplexing (OFDM) techniques may be applied to composed signals having the desired characteristics, and additionally may facilitate the application of frequency domain equalisation (128) in order to mitigate transmission impairments, including dispersion. Improvements in received signal quality, and/ or transmission distance, may thereby be achieved, along with simplification of receiver configuration and operation.

7 Claims, 6 Drawing Sheets

U.S. PATENT DOCUMENTS

| | | | |
|---|---|---|---|
| 5,301,058 A | | 4/1994 | Olshansky |
| 5,812,294 A | | 9/1998 | Wilson |
| 6,559,994 B1 | * | 5/2003 | Chen et al. .................. 398/182 |
| 6,587,257 B1 | | 7/2003 | Davies |
| 6,917,764 B1 | * | 7/2005 | Wilson ........................ 398/193 |
| 7,330,667 B2 | * | 2/2008 | Fells ........................... 398/193 |
| 7,580,630 B2 | * | 8/2009 | Kee et al. ...................... 398/25 |

FOREIGN PATENT DOCUMENTS

| | | |
|---|---|---|
| WO | WO 2007/041799 A2 | 4/2007 |

OTHER PUBLICATIONS

Shieh, W. et al., "High-Speed and High Spectral Efficiency Coherent Optical OFDM," IEEE, 2008, 115-116.

Jansen, S.L. et al., "10×121.9-Gb/s PDM-OFDM Transmission with 2-b/sHz Spectral Efficiency over 1,000 km of SSMF," Fiber Optics Communications, 2007, 3 pages.

Kazushige Yonenaga et al., "100 Gbit/s All-Optical OFDM Transmission Using 4 × 25 Gbit/s Optical Duobinary Signals with Phase-Controlled Optical Sub-Carriers," IEEE OFC/FOEC 2008, 3 pages.

* cited by examiner

METHODS AND APPARATUS FOR GENERATION AND TRANSMISSION OF OPTICAL SIGNALS

FIELD OF THE INVENTION

The present invention relates generally to optical communications, and more particularly to improvements in methods and apparatus for generation and transmission of optical signals. The disclosed methods and apparatus are particularly beneficial when used in combination with dispersive optical channels, and direct detection receivers, although the potential advantages are not limited to such applications.

BACKGROUND OF THE INVENTION

Optical transmission, in which an information signal is modulated onto an optical carrier, is widely employed in modern communications systems. In particular, many long-haul transmission networks employ single-mode optical fibres for the transmission of digital information at high bit rates, using one or more optical carriers, or wavelengths, over each fibre. Indeed, recent advances in optical technologies, including improvements in optical fibres, optical modulators, and the development of reliable and commercially practical optical amplifiers, have enabled the deployment of optical transmission paths capable of transporting on the order of 1 Tb/s over distances of thousands of kilometers, without the need for electronic regeneration. Individual optical channels in such systems typically carry information streams at rates of 2.5 Gb/s, 10 Gb/s, or even higher.

However, long-haul optical transmission systems are ultimately limited by distortion and degradation of the transmitted signals, arising primarily from dispersion (eg chromatic and polarisation mode dispersion), nonlinear transmission processes, and noise introduced by optical amplifiers. Any one of these processes alone can be overcome, or at least mitigated, by relatively simple means. For example, the effects of chromatic dispersion, which is a linear process, can be reversed by suitable optical equalisation means, such as by propagating dispersion-affected signals through equalisers having a corresponding inverse dispersion characteristic, such as a suitable length of dispersion compensating fibre (DCF). However, since DCF represents an additional signal propagation path having its own attenuation and nonlinear properties, there remains a limit to the amount of dispersion that can be compensated in this manner while maintaining adequate overall signal quality. Similarly, nonlinear effects may be reduced by limiting the total optical power within each fibre, while conversely the effects of optical noise are minimised by maintaining a high optical power level. As will be appreciated, therefore, it is not so much the individual contributions to signal degradation that ultimately limit transmission distance and/or capacity, but rather the interactions between the contributing processes, and the means and methods employed for their minimisation.

At the same time as optical transmission technologies have been advancing, corresponding improvements have been made in the electronic and digital technologies deployed in terminal equipment, such as transmitting, receiving and switching nodes. In the past, it has not been considered viable to perform significant signal processing within the electronic domain, when operating at the very high bit rates employed in long-haul optical transmission systems. However, with recent technological advances this is no longer the case. There has accordingly been interest in recent times in seeking to mitigate the effects of optical signal degradation processes, and in particular dispersion and nonlinear effects, within the electronic, rather than the optical, domain. Advantageously, such an approach is anticipated to enable a greater proportion of the available optical power budget to be effectively deployed in achieving greater transmission capacity and/or distance.

While some advances have been made in the development of electronic processing for the mitigation of optical signal degradation, certain features of the optoelectronic interface have continued to limit the net benefits available from this approach. In particular, the most robust, practical and cost-effective optical transmission systems employ optical intensity modulation at the transmitting end, in combination with direct detection at the receiving end. Direct detection systems are also known as "square law" detectors, because the relationship between the optical field incident on the detector and the resulting electrical output (eg photocurrent) follows a square law, photocurrent being proportional to optical intensity or power, rather than optical field amplitude.

While recent developments in optical modulation technology have improved the practicality of generating transmitted optical signals having properties that differ from those of conventional intensity modulated signals, there remain considerable advantages in employing direct detection systems. In particular, direct detection receivers are effectively wavelength independent within the usual optical transmission windows, and do not require additional optical components (such as local oscillator laser sources) and associated optical and/or electronic control that is typically associated with alternative coherent detection approaches.

It is believed that further improvements are possible in the methods and apparatus utilised for the generation and transmission of optical signals, particularly in direct detection systems, and it is accordingly an object of the present invention to address the need to realise such improvements.

SUMMARY OF THE INVENTION

In one aspect, the present invention provides a method of transmitting information in an optical transmission system which includes:

an optical transmitter having at least one electrical input and an optical output arranged such that a signal applied at said electrical input is modulated onto an optical carrier and emitted at said optical output, and wherein there is a predetermined nonlinear relationship between input electrical signal amplitude and corresponding output optical field amplitude;

an optical receiver having an optical input and an electrical output, and wherein there is a square law relationship between amplitude of an optical field applied to the optical input and a corresponding electrical output signal; and an optical channel disposed between the optical transmitter and the optical receiver, wherein the method includes the steps of:

composing an electrical signal bearing said information, the signal having a corresponding frequency spectrum which includes a plurality of spectral components having the property that difference frequencies thereof do not substantially interfere with any of said spectral components;

predistorting said signal in accordance with a predistortion characteristic which is substantially an inverse to said nonlinear relationship between input electrical signal amplitude and corresponding output optical field amplitude of the optical transmitter;

applying the predistorted signal to the electrical input of the optical transmitter to generate a corresponding information-bearing signal at the optical output thereof; and transmitting the information-bearing optical signal over the optical channel along with an optical carrier component.

Advantageously, the inventive method provides an information-bearing transmitted optical signal having improved characteristics, which in turn may enable improvements in received signal quality, transmission capacity and/or transmission distance to be achieved. In particular, the invention provides for the generation and transmission of an optical signal wherein there is a substantially linear relationship between optical field amplitude and a corresponding electrical signal. This is in contrast to conventional optical transmitters which either employ no linearisation at all, or alternatively seek to linearise the relationship between the transmitted optical power, or intensity, and the driving electrical signal. This conventional focus upon achieving a linear relationship between electrical signal amplitude and optical power arises due to the nature of direct detection receivers, which themselves produce an output electrical signal that is proportional to received optical power. Accordingly, it has previously been generally considered desirable to maintain a linear relationship between the driving electrical signal at the transmitting end, and the corresponding detected electrical signal at the receiving end, from which it follows that a transmitter which has a linear optical power characteristic is required. Such conventional systems are often known as intensity modulation/direct detection (IMDD) systems.

However, it is a particular characteristic of IMDD optical transmission systems that no use is made of information contained in the phase of the transmitted optical field, and indeed the optical phase information is substantially destroyed in the conventional direct detection process. This is unfortunate, because there are significant optical processes leading to signal degradation, such as dispersion and certain nonlinear processes, which manifest themselves in frequency- and/or power-dependent changes in optical phase, and which can therefore be eliminated, or at least mitigated, by making suitable compensating adjustments to the transmitted and/or received optical phase. Such compensation may be performed in the electrical domain, substantially simplifying and/or improving the flexibility of optical transmission systems, only if the optical phase information remains available following optical-to-electrical conversion in the receiver. It is generally believed that optical phase information can only be preserved into the electrical domain via the use of methods which increase the complexity and cost, and/or reduce the flexibility, of the system, such as coherent optical detection.

Furthermore, even when coherent optical detection techniques are employed, enabling optical phase information to be preserved into the electrical domain, it remains the case that conventional optical transmission methods do not achieve a linear relationship between the driving electrical signal and the corresponding optical field amplitude. Thus a signal retrieved using appropriate coherent techniques, which retains optical phase information, nonetheless has an amplitude characteristic which generally will not bear a linear relationship with the original driving electrical signal, and which accordingly includes distortions of the transmitted signal resulting from the nonlinearity of the optical transmitter.

The present invention, in at least preferred embodiments, therefore provides a number of improvements over the prior art. Firstly, predistortion is applied which accounts for the nonlinear relationship between electrical signal amplitude and corresponding output optical field amplitude, rather than output optical power. Secondly, the information-bearing electrical signal that is originally created, prior to predistortion and optical transmission, is composed so as to ensure that difference frequency components of the signal, which will be generated inherently by the square law nature of an optical direct detector, do not interfere with the information-bearing spectral components of the signal. Together, the predistortion and signal composition of the present invention enable the recovery of the transmitted electrical signal at the receiving end in such a manner that distortions resulting from the nonlinear nature of the transmitter and receiver may be substantially eliminated. Furthermore, by transmitting an optical carrier component along with the information-bearing optical signal, a direct detection receiver will recover the original transmitted signal spectral components within their original corresponding spectral bandwidth. The need for coherent detection, or other more complex and costly, or less flexible, detection schemes is avoided.

While the signal ultimately recovered in a system employing a method in accordance with the invention will, in general, be degraded in accordance with characteristics of the optical channel, such as dispersion, optical noise and nonlinear effects, the inventive method enables these various effects to be addressed, equalised and/or compensated using electrical signal processing techniques. As will be appreciated, various sophisticated methods for channel equalisation, noise mitigation and information recovery have been developed, particularly through the use of modern digital signal processing techniques, and advances in digital technology in particular enable these methods to be employed at increasingly high data rates, such as those utilised in typical optical transmission systems.

In different embodiments of the invention, various techniques may be employed in the step of composing the information-bearing signal. For example, the information may be modulated onto one or more radio frequency (RF) subcarriers, to produce a resulting information-bearing signal having the desired spectral properties. If desired, filters may be used to shape the spectral characteristics of the information-bearing signal.

In a particularly preferred embodiment, the information-bearing electrical signal is composed using orthogonal frequency division multiplexing (OFDM) techniques. The application of OFDM techniques in optical transmission systems has previously been disclosed in international patent application no. PCT/AU2006/001282, and international patent application no. PCT/AU2006/001511, both of which are incorporated herein in their entirety by reference. The use of OFDM methods provides a number of additional advantages in the context of the present invention. For example, OFDM enables a very high level of control over the frequency spectrum of the composed signal, which effectively consists of a large number of orthogonal frequency subcarriers, each of which is determined by a corresponding input to a frequency/time transformation, typically implemented as a an inverse fast Fourier transformer (IFFT). Composing a signal having a frequency spectrum with the specified properties is therefore both simple and computationally efficient. Furthermore, as disclosed particularly in the two abovementioned international patent applications, frequency domain equalisation techniques may be applied in combination with OFDM methods to compensate for the effects of linear dispersion, and chromatic dispersion in particular.

Without limitation, two particular forms are presently preferred for the frequency spectrum of the signal generated in the composing step. According to a first preferred arrangement, the signal occupies a continuous spectral band of bandwidth W having a minimum frequency $f_{min}$, wherein $f_{min}$ is greater than or equal to W. Alternatively, according to a second preferred arrangement, the signal is modulated in a mutually orthogonal manner onto a plurality of frequency subcarriers, wherein each subcarrier is spaced from adjacent subcarriers by a frequency interval which is an integer multiple of a frequency $2f_0$, and the lowest frequency subcarrier is substantially located at a frequency which is an odd-numbered multiple of $f_0$.

Both of the aforementioned preferred frequency schemes utilise 50 percent of the baseband frequency spectrum, and are therefore presently believed to be exemplary of the most spectrally efficient embodiments. However, it is not essential to the invention that these particular schemes be used, nor that maximum spectral efficiency be achieved in any particular embodiment. In particular, it will be appreciated that signal spectra substantially equivalent to those of the abovementioned schemes may be achieved by distributing the frequency components in any desired manner over corresponding positive and/or negative frequencies in the electrical domain and/or over corresponding upper and/or lower spectral sidebands in the optical domain. Single sideband signals may be preferable, if only because management and compensation of dispersion may be simpler, and compensation for nonlinear processes more effective, in the single-sideband case.

Furthermore, while it is generally preferred that digital signal processing techniques be used to compose the information-bearing signal, it will be appreciated that signals having the required spectral properties may be generated using either analog circuits, digital signal processing, or by any convenient combination of analog and digital methods.

In accordance with embodiments of the invention, the predistortion characteristic applied in the predistorting step depends upon details of the optical transmitter.

As a first example, if the optical transmitter employs an ideal linear intensity modulator, the nonlinear relationship between the input electrical signal amplitude and corresponding output optical field amplitude is a square-root relationship (ie the input electrical signal amplitude is the square of the output optical field amplitude). Accordingly, in this example the appropriate predistortion characteristic includes a squaring function. Preferably, a non-negative bias, or constant offset, is also included in the predistortion characteristic, of sufficient magnitude to ensure that the signal is non-negative prior to application of the squaring function. In practice, large negative excursions of the signal may be unavoidable, and it may therefore also be necessary, or desirable, to limit the amplitude of such excursions. As will be appreciated, the practical concern in such embodiments is to ensure that the signal to which the squaring function is applied has a single known sign (ie either positive or negative) at all times, to avoid a situation in which the predistortion characteristic does not have a unique inverse.

As a second example, a non-ideal (eg nonlinear) intensity modulator may in general be linearised using analog or digital techniques in order to more closely approximate the ideal linear intensity modulator. Accordingly, any embodiment of the invention in which the optical transmitter includes an intensity modulator may generally employ a predistortion characteristic which accounts for both the nonlinear transfer characteristic of the intensity modulator, as well as the square root relationship between input electrical signal amplitude and output optical field amplitude, in order to determine a total predistortion characteristic which is substantially an inverse to the net nonlinear relationship between the input electrical signal amplitude and corresponding output optical field amplitude of the optical transmitter.

As a further example, optical transmitters employing interference type modulators are now common, and such modulators operate by applying a phase modulation to an optical carrier wave propagating in at least one path of an interferometric structure. A particularly preferred interferometric structure in integrated optical devices, such as planar waveguide modulators, is a Mach-Zehnder structure. Interference type modulators may provide a single electrode, to which a single electrical driving signal is applied, or may provide dual electrodes, or higher numbers of electrodes, allowing for varying degrees of control over the properties of the output optical signal. An in-phase/quadrature (IQ) optical modulator is a particularly useful example of an interference type modulator, which consists of a "nested" interferometric structure which enables independent modulation of in-phase and quadrature components of the optical field.

All interference-type modulators are nonlinear in their intensity/amplitude characteristics, and in particular the modulation characteristic of an interference-type modulator is inherently sinusoidal in intensity/power, as a function of the applied electrical input signal amplitude.

Some interference-type modulators are configured as intensity modulators, and are permanently biased at the so-called "quadrature" point (ie halfway between the minimum and maximum transmission points). Linearisation of the intensity modulation characteristic of such modulators may be achieved via an inverse sinusoidal characteristic. An additional squaring function will provide for linearisation of the relationship between the driving electrical signal amplitude and the corresponding output field amplitude. As will be appreciated, the overall nonlinear predistortion characteristic employed in corresponding embodiments of the present invention includes a combination of the squaring and inverse sinusoidal functions.

Other implementations of interference-type modulators are configurable to an operator-defined bias point. When such modulators are employed, it is particularly preferred that the bias be set at the transmission "null" point, ie the minimum transmission point, corresponding with maximum destructive interference at the interferometer output. Advantageously, when operated around this point the optical output field exhibits both positive and negative amplitude excursions, enabling the phase or "sign" of the optical signal to be controlled. As described above, an appropriate inverse-sinusoidal predistortion characteristic may readily be determined. However, by biasing the modulator at the minimum transmission point, the need to apply a non-negative bias to the information-bearing signal may be avoided, taking advantage of the fact that a unique one-to-one relationship between positive/negative signal amplitude, and corresponding positive/negative optical field amplitude, can now be achieved. This may potentially result in improved optical power efficiency and dynamic range. For example, by employing the full range of the modulator about the transmission null, improved signal-to-noise ratio may be achieved, enabling higher order modulation schemes to be employed (such as QAM schemes having increased numbers of constellation points) in composing the information-bearing signal. Alternatively, by biasing the modulator slightly away from the transmission null, the transmitter may be configured to automatically include the required optical carrier component in the transmitted signal. Such biasing may be achieved either directly, for example by control of fixed voltage offsets applied to modulator electrodes, or by applying a suitable bias or offset to the information-bearing signal, which may be incorporated into the predistortion characteristic.

While a number of exemplary embodiments have been summarised in the foregoing paragraphs, in a general case in which an arbitrary nonlinear modulator is employed within an optical transmitter, the overall nonlinear relationship between electrical signal amplitude and output optical field amplitude may be determined by theoretical, experimental or simulation means, whereby a corresponding inverse nonlinear function may be synthesised. Accordingly, the foregoing examples are not to be considered in any way limiting of the scope of the invention.

While the relationship between input electrical signal amplitude and output optical field amplitude for any given modulator will not, in general, be a uniquely invertible one-to-one function, an appropriate domain over which the relation is one-to-one may be selected and appropriate limiting and/or biasing (eg constant offset) of the signal may be incorporated into the predistortion characteristic applied to the signal in order to restrict the input to the range corresponding with the selected domain of the nonlinear relationship. Accordingly, a general procedure for determining a suitable predistortion characteristic applicable to any selected modulator may readily be developed.

In the case of multiple input modulators, such as IQ modulators, it will be appreciated that a nonlinear relationship generally exists between each of the multiple electrical inputs and a corresponding modulation of the optical field amplitude appearing at the optical output. Accordingly, in the most general approach a procedure for determining an appropriate predistortion characteristic, according to any appropriate one of the examples provided above, or to the most general procedure, may be applied in relation to each individual modulator input. Accordingly, it will be appreciated that the invention is not in any way limited to single-input modulators.

In another aspect, the present invention provides an apparatus for transmitting information via an optical channel to a remotely-located optical receiver, wherein said receiver has an optical input and an electrical output having a square law relationship between the amplitude of an optical field applied to the optical input and a corresponding electrical output signal, the apparatus including:

an optical transmitter having at least one electrical input and an optical output arranged such that a signal applied at said electrical input is modulated onto an optical carrier emitted at said optical output, and wherein there is a predetermined nonlinear relationship between input electrical signal amplitude and corresponding output optical field amplitude;

a signal generator configured to compose an electrical signal bearing said information, the signal having a corresponding frequency spectrum which includes a plurality of spectral components having the property that difference frequencies thereof do not substantially interfere with any of said spectral components; and predistortion means having a predistorted signal output, and which is configured to generate at said output a predistorted signal by applying to said composed signal a predistortion characteristic which is substantially an inverse to said nonlinear relationship between the input electrical signal amplitude and corresponding output optical field amplitude of the optical transmitter, wherein the predistorted signal output is operatively coupled to the electrical input of the optical transmitter, and the optical output of the optical transmitter is operatively coupled to the optical channel, such that an information-bearing optical signal is transmitted along with an optical carrier component via the optical channel.

In accordance with preferred embodiments, the signal generator and the predistortion means include digital hardware and/or software means for composing a signal having the desired spectral properties, and for applying the predistortion characteristic thereto. It may typically be particularly convenient to implement both the signal generator and the predistortion means using appropriate software components executed on one or more digital signal processing and/or general purpose processing devices. However, such embodiments should not be considered limiting of the invention, and equivalents utilising dedicated digital hardware components and/or analog electronic circuitry will also be apparent to those skilled in the art of signal processing. Arrangements and processing functions that are, in particular, applicable to the generation of signals in accordance with block coding methods generally, and OFDM methods in particular, are disclosed in international application nos. PCT/AU2006/001282 and PCT/AU2006/001511.

The optical transmitter preferably includes an optical source, such as a semiconductor laser or other source of optical radiation, and typically further includes electrical driving circuitry for modulating the optical source, most preferably via a discrete or integrated external optical modulator. In such embodiments, the predetermined nonlinear relationship between input electrical signal amplitude and corresponding output optical field amplitude is primarily determined by the characteristics of said optical modulator.

The optical transmitter is also preferably configured to generate and incorporate the optical carrier component in the transmitted optical signal. The optical carrier component may be a residual carrier component appearing at the output of the optical modulator. Alternatively, a portion of the optical field output from the optical source may be tapped-off, for example using an optical splitter, and recombined with the output of the optical modulator, for example using an optical combiner. Various other arrangements for incorporating the optical carrier component into the transmitted optical signal will be apparent to those skilled in the art.

In yet another aspect, the present invention provides a method of transmitting information in an optical transmission system which includes:

an optical source having an optical carrier frequency; and an optical receiver having an optical input and an electrical output, and wherein there is a square law relationship between amplitude of an optical field applied to the optical input and a corresponding electrical output signal, wherein the method includes the steps of:

composing a time-varying electrical signal bearing said information, the signal having a corresponding frequency spectrum which includes a plurality of radio frequency (RF) spectral components; and applying the time-varying electrical signal to the optical source to produce a transmitted optical signal which includes two optical sidebands disposed about the optical carrier frequency, each said sideband including one or more optical frequency spectral components, wherein each said RF spectral component corresponds with one of said optical frequency spectral components, and wherein the optical frequency spectral components have the property that RF difference frequencies thereof, generated when detecting the transmitted optical signal at the optical receiver, do not substantially interfere with one another.

The step of composing a time-varying signal is preferably performed such that the RF spectral components have the property that difference frequencies thereof do not substantially interfere with any of said RF spectral components. In accordance with this preferred approach, a transmission system may be configured such that the optical frequency spectral components resulting from modulation of an optical source by the time-varying electrical signal will have the required property that RF difference frequencies thereof, generated when detecting the transmitted optical signal at the optical receiver, do not substantially interfere with one another. In particular, this may be achieved by using a linear, or linearised, optical modulator to apply the time-varying electrical signal to the optical source.

In accordance with preferred embodiments, block coding methods, such as those disclosed in international application no. PCT/AU2006/001511, are used to compose the time-varying electrical signal. In particular, the information may be digital information which is encoded into a series of blocks, each block including a plurality of transmitted data symbols corresponding with one or more bits of said digital information, and a transmitted time-varying signal generated which corresponds with each of said blocks. In particularly preferred arrangements, the block coding methods are based upon orthogonal frequency division multiplexing (OFDM) techniques.

The composing step may be performed such that the signal is modulated in a mutually orthogonal manner onto a plurality of frequency subcarriers, wherein each subcarrier is spaced from adjacent subcarriers by a frequency interval $2f_0$, and the lowest frequency subcarrier is substantially located at a frequency which is an odd-numbered multiple of $f_0$.

In a still further aspect, the present invention provides an apparatus for transmitting information via an optical channel to a remotely located optical receiver, wherein said receiver has an optical input and an electrical output having a square law relationship between the amplitude of an optical field applied to the optical input and a corresponding electrical output signal, the apparatus including:

an optical source having an optical carrier frequency;

a signal generator configured to compose a time-varying electrical signal bearing said information, the signal having a corresponding frequency spectrum which includes a plurality of radio frequency (RF) spectral components; and a modulator configured to apply the time-varying electrical signal to the optical source to produce a transmitted optical signal which includes two optical sidebands disposed about the optical carrier frequency, each said sideband including one or more optical frequency spectral components, wherein each said RF spectral component corresponds with one of said optical frequency spectral components, and wherein the optical frequency spectral components have the property that RF difference frequencies thereof, generated when detecting the transmitted optical signal at the optical receiver, do not substantially interfere with one another.

In yet another aspect, the present invention provides a method of transmitting information in an optical transmission system which includes an optical source having an optical carrier frequency, wherein the method includes the steps of:

composing a time-varying electrical signal bearing said information, the signal having a corresponding frequency spectrum which includes a plurality of radio frequency (RF) spectral components; and applying the time-varying electrical signal to the optical source to produce a transmitted optical signal which includes at least one optical sideband relative to the optical carrier frequency, said sideband including one or more optical frequency spectral components, wherein each said RF spectral component corresponds with one of said optical frequency spectral components, and wherein the optical frequency spectral components have the property that each said spectral component is spaced from adjacent spectral components by a frequency which is an integer multiple of a frequency $2f_k$, and from the optical carrier frequency by a frequency that is an odd-numbered multiple of $f_k$.

A further aspect of the invention provides an optical transmitter including an optical source, and configured to generate a transmitted optical spectrum in accordance with the foregoing method.

Further preferred features and advantages of the invention will be apparent to those skilled in the art from the following description of preferred embodiments of the invention, which should not be considered to be limiting of the scope of the invention as defined in the preceding statements, or in the claims appended hereto.

BRIEF DESCRIPTION OF THE DRAWINGS

Preferred embodiments of the invention are described with reference to the accompanying drawings, in which.

DETAILED DESCRIPTION OF PREFERRED EMBODIMENTS

Figure 1:
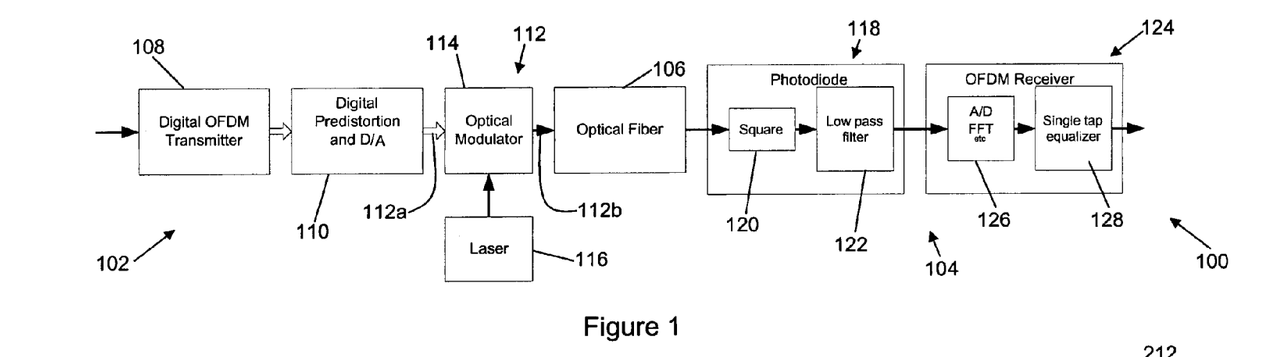
FIG. 1 illustrates schematically a system for communicating digital information over an optical channel according to an embodiment of the invention.

FIG. 1 illustrates schematically a system 100 for communicating digital information over an optical channel, namely optical fibre link 106, according to an embodiment of the present invention.

The exemplary system 100 includes apparatus 102 for generating and transmitting an optical signal bearing digital information over the optical fibre 106 to remotely located receiving apparatus 104. The transmission fibre 106 may generally include a plurality of individual single-mode fibre sections, having loss-compensating amplifiers inserted therebetween, to overcome losses in signal power resulting from the attenuation of the single-mode fibre links. Accordingly, the optical fibre transmission channel 106 generally causes degradation of the transmitted signal, including dispersion (polarisation and chromatic), additive optical noise, and non-linear distortion. Desirably, although not directly the subject of the present invention, such signal degradation may be mitigated, equalised and/or otherwise compensated in the electrical domain, for example within the receiving apparatus 104 and/or the transmitting apparatus 102. However, it is an object of the present invention to provide for the transmission of optical signals having characteristics that simplify the implementation and/or improve the performance of systems employing electronic compensation.

To this end, the transmitting apparatus 102 includes a signal generator 108, predistortion means 110, and an optical transmitter 112 including an optical source 116 and associated discrete optical modulator 114. Accordingly, the optical transmitter 112 has an electrical input 112*a*, being an electrical drive input of the optical modulator 114, and an optical output 112*b*, being the optical output port of the discrete optical modulator 114. While a variety of different optical transmitter technologies are available, employing corresponding differing types of optical modulator (some examples of which are discussed in greater detail with reference to FIGS. 4, 5 and 6), a key observation in relation to the present invention is that there generally exists a predetermined nonlinear relationship between electrical signal amplitude applied at the transmitter input 112*a* and corresponding optical field amplitude at the optical output 112*b*. In particular, many types of optical modulator are designed to provide a predetermined relationship (which may be either linear or nonlinear) between applied electrical signal amplitude and output optical intensity. In some conventional systems, predistortion techniques are applied to linearise the intensity response of nonlinear intensity modulators. However, in all such systems there remains a nonlinear relationship between the applied electrical signal amplitude and the corresponding output optical field amplitude, which is generally proportional to the square root of the optical intensity.

Turning now to the receiving apparatus 104, a direct detection receiver is provided which includes a photodiode 118, and a decoder/receiver 124, which is matched to the signal generator 108 as described in greater detail below. The receiving apparatus 104 may optionally include an optical filter (not shown) prior to the photodiode 118, if required to eliminate or reduce optical noise and/or interfering signals at wavelengths outside the desired optical bandwidth.

The photodiode 118 is modelled schematically as a squaring operation 120, followed by a low-pass filter 122. In effect, a direct detection optical receiver produces an electrical signal (typically a photocurrent) that depends upon the square of the received instantaneous optical field amplitude (corresponding with optical intensity in a conventional IMDD transmission system), having a limited baseband bandwidth, which is modelled by the low-pass filter 122. While not shown in FIG. 1, it will be appreciated that a practical receiving apparatus will typically also include various electronic components, such as amplifiers, filters and the like, for conditioning the received signal for further processing. It is, however, a generally straightforward matter to incorporate these additional components within the model of the photodiode 118, and accordingly the omission of such components may be made without loss of generality.

In accordance with preferred embodiments of the invention, the signal generator 108 is a digital OFDM transmitter, and a corresponding OFDM receiver 124 is thus provided at the receiving end. The OFDM receiver 124 typically includes general conversion and processing components 126, including analog-to-digital converters, a fast Fourier transform, and so forth. In accordance with preferred embodiments, a single tap equaliser 128 is also provided, which is able to substantially compensate for the effects of linear dispersion within the optical channel 106. Further details of the digital OFDM transmitter 108 and the OFDM receiver 124 are not included herein, however more detailed disclosures of suitable configurations, and their general operation, may be found in the prior international patent application nos. PCT/AU2006/001282 and PCT/AU2006/001511, for example. It is to be understood that the use of digital OFDM transmitter 108 and OFDM receiver 124 is not essential to the present invention, however these provide a particularly convenient method for generating signals having desirable spectral characteristics, as will now be discussed with reference to FIGS. 2 and 3.

Turning now to FIG. 2 (comprising FIGS. 2A, 2B, 2C and 2D), there is depicted schematically a number of exemplary optical spectra including a plurality of frequency subcarriers having characteristics appropriate for use with the present invention. It is to be understood that additional to any linearisation applied at the transmitting end 102 of the system 100, it is an inevitable consequence of the square law detection characteristic of the photodiode 118 that the received electrical spectrum will include components corresponding with difference frequencies of the received optical signal spectrum. In the case of IMDD systems, incorporating dispersion compensation within the optical domain, the difference frequency components in fact correspond with components of the original transmitted electrical signal, and the square law operation of the direct detection receiver 118 corresponds with the "square root" operation that is inherent in the process of intensity modulation at the transmitter 112. However, if the effects of dispersion and/or other forms of signal degradation are not fully compensated in the optical domain prior to direct detection, the original phase relationships between the various components of the transmitted optical spectrum are not restored, and the direct detection of such distorted signals does not result in correct reconstruction of the original transmitted signal. Furthermore, since the optical phase information is effectively destroyed in the direct detection process of an IMDD system there is no effective way to fully recover the undistorted signal, even though processes such as chromatic dispersion are entirely linear in nature, and thus in principal completely reversible. It is thus desirable to provide an optical transmitted signal having characteristics such that, following direct detection, sufficient phase information is retained to enable mitigation or equalisation of at least the linear dispersion processes.

Figure 2A:
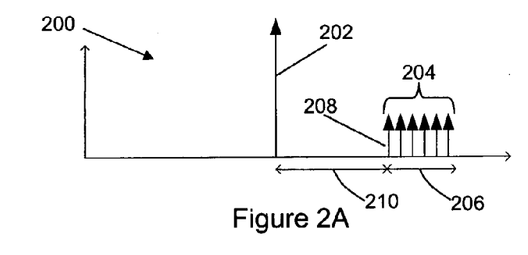
FIGS. 2A, 2B, 2C and 2D illustrate schematically optical spectra of transmitted signals composed in accordance with preferred embodiments of the invention.

One prerequisite for achieving this desired outcome is that interference, resulting from square law detection, by components of the received electrical signal corresponding with difference frequencies of the received optical spectrum (ie intermodulation distortion) be avoided. This may be achieved by appropriate selection of the spectral form of the transmitted optical signal, which in turn corresponds with the frequency spectrum of the signal generated by the digital OFDM transmitter, or other signal generator, 108. A first suitable optical spectrum 200 is illustrated in FIG. 2A, including an optical carrier 202, and a band of subcarriers 204, bearing information to be transmitted via the optical fibre link 106. The subcarriers 204 occupy a bandwidth $W_1$ (206), which is spaced from the optical carrier frequency 202 by a vacant bandwidth $W_2$ (210). The optical spectrum 200 is an optical single sideband (OSSB) spectrum, ie there is no corresponding band of subcarriers located on the opposite side of the optical carrier frequency 202. So long as bandwidth $W_2$ is greater than or equal to the bandwidth $W_1$, at the receiver there will be no difference frequency component generated within the desired received signal band.

Figure 2B:
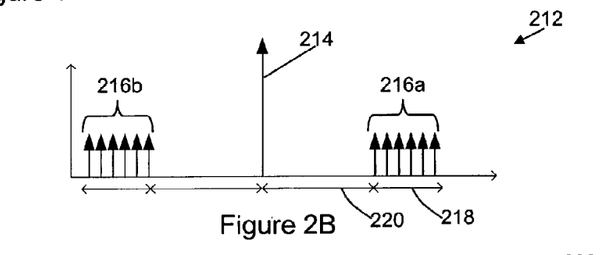

In FIG. 2B there is shown a second exemplary optical frequency spectrum 212, again including an optical carrier 214, and an upper sideband of subcarriers 216*a* occupying a bandwidth $W_1$ (218), and spaced by a vacant bandwidth $W_2$ (220), which is greater than or equal to $W_1$. The spectrum 212 is a double sideband (DSB) spectrum, including a lower sideband of subcarriers 216b which is a conjugate image in the optical carrier frequency 214 of the upper sideband 216a.

The optical spectra 200, 212 correspond with an electrical signal generated by the signal generator 108 which occupies a bandwidth W, equal to the optical bandwidth $W_1$, and having a minimum subcarrier frequency $f_0$ which is equal to the optical bandwidth $W_2$. The optical spectrum 212 may be generated using an intensity modulator operated in accordance with an embodiment of the present invention, whereas additional optical and/or electrical processing is required in order to generate the OSSB spectrum 200.

Figure 2C:
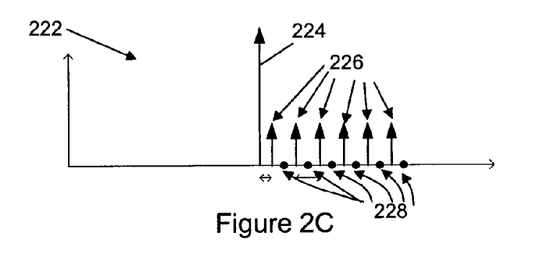

FIG. 2C illustrates a further suitable optical spectrum 222, which includes an optical carrier 224, and a group of information-bearing subcarriers 226. In the spectrum 22, each of the information-bearing subcarriers 226 is spaced from the optical carrier frequency 224 by an odd multiple of the frequency $f_k$. The even multiples of this frequency $f_k$, indicated by the reference numeral 228, are unused. Consequently, each optical subcarrier is spaced from adjacent subcarriers by frequency interval $2f_k$. Once again, following direct detection the corresponding electrical spectrum includes difference frequency components that do not interfere with any of the desired information-bearing signal components. The optical spectrum 222 is an OSSB spectrum, while FIG. 2D illustrates the corresponding DSB spectrum 230, consisting of optical carrier 232, and upper and lower sidebands consisting of information-bearing subcarriers 234a, 234b, and unused frequencies 236a, 236b.

The signal spectrum composed by the signal generator 108 corresponding with the optical spectra 222, 230 consists of a plurality of frequency subcarriers each of which is spaced from adjacent subcarriers by a frequency interval $2f_0$, where $f_0$ is equal to the optical frequency interval $f_k$, and having a lowest frequency subcarrier which is substantially located at a frequency which is an odd-numbered multiple of $f_0$.

All of the frequency spectra illustrated in FIG. 2 have the property that 50 percent of the corresponding electrical baseband spectrum is utilised. It is presently believed that these are therefore the most spectrally efficient suitable spectral forms. However, it will be appreciated that various alternative spectral forms may be employed, for example having equal or lesser spectral efficiency.

Figure 2D:
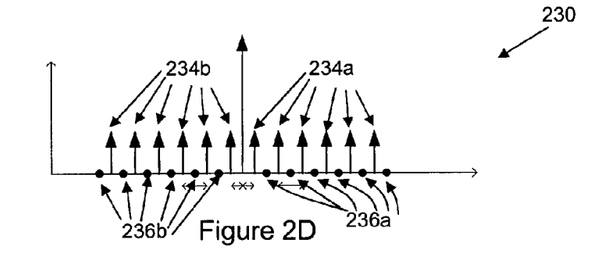

For example, in one alternative embodiment closely related to the optical signal spectra shown in FIGS. 2C and 2D, one or more of the information-bearing subcarriers 226, 234a, 234b may be unused. Such an arrangement results in reduced spectral efficiency, but may be desirable, for example, in circumstances in which the SNR at the receiver in one or more such subcarriers is unsatisfactory, while the SNR in used subcarriers remains acceptable. In this embodiment, each optical subcarrier is spaced from adjacent subcarriers by a frequency interval which is an integer multiple of $2f_k$.

Furthermore, it should be noted in particular that a plurality of optical spectra substantially equivalent to the OSSB spectra 200, 222, and/or related arrangements, in terms of corresponding received electrical spectra, may be defined by distributing the various frequency components 204, 226 over upper and lower sidebands, rather than by placing all frequency components within a single sideband.

More generally, while it has previously been recognised that OSSB signals may be used in order to preserve optical phase information following direct detection (as disclosed, for example, in international application no. PCT/AU2006/001511), it is now noted, in accordance with embodiments of the present invention, that various other, novel, optical signal formats may advantageously be utilised. More particularly, the OSSB spectra 200, 222 may be considered as special cases of a more general class of spectra which have the property that RF difference frequencies thereof, generated when detecting the transmitted optical signal at an optical receiver, do not substantially interfere with one another. Based upon this novel observation, in some envisaged embodiments of the invention a time-varying signal bearing information to be transmitted, and having a corresponding frequency spectrum which includes a plurality of RF spectral components, is applied to an optical source having an optical carrier frequency so as to produce a transmitted optical signal which includes two optical sidebands disposed about the optical carrier frequency. In accordance with such embodiments, each said sideband includes one or more optical frequency spectral components, and each of the RF spectral components of the electrical signal corresponds with one of these optical frequency spectral components. The transmitted optical signal is generated, as previously mentioned, such that the optical frequency spectral components have the property that RF difference frequencies thereof, generated when detecting the transmitted optical signal at the optical receiver, do not substantially interfere with one another.

While the optical spectra depicted in FIG. 2A to 2D, and related arrangements as described above, are particularly disclosed herein for use in conjunction with predistortion in order to mitigate the problems associated with the generally nonlinear relationship between electrical signal amplitude and corresponding optical field amplitude in conventional optical transmission systems, a number of these spectral arrangements are presently believed to be novel, and to have potential advantages, in their own right. For example, the spectrum 222 of FIG. 2C may be less susceptible to certain forms of transmission impairment, such as PMD. Accordingly, such novel spectral configurations are encompassed within various aspects of the present invention.

Returning again to FIG. 1, it will be appreciated that the use of a digital OFDM transmitter 108 as the signal generator for composing the information-bearing signal has the advantage that the desired signal spectrum may be generated in a simple and computationally efficient manner. However, it will also be appreciated that other information-bearing signals may be composed which have the required spectral property that corresponding difference frequencies do not substantially interfere with any of the information-carrying spectral components.

Figure 3A:
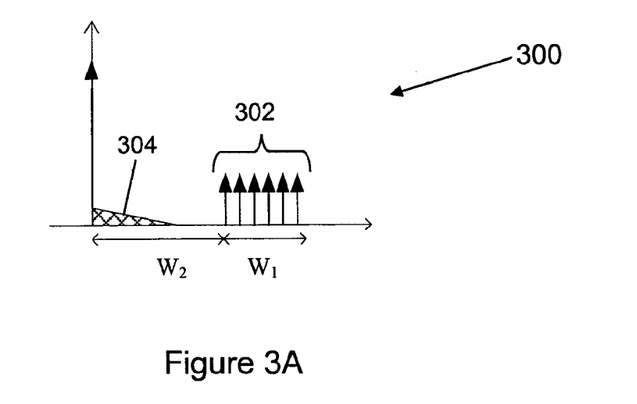
FIGS. 3A, 3B and 3C illustrate schematically electrical spectra of received signals composed at a corresponding transmitter in accordance with preferred embodiments of the invention.

FIG. 3 (comprising FIGS. 3A, 3B and 3C) illustrates various received electrical signal spectra corresponding with the optical signal spectra of FIG. 2. The electrical spectrum 300 corresponds with optical spectrum 200, and includes desired information-bearing subcarriers 302 occupying the bandwidth W (corresponding with optical bandwidth $W_1$), and intermodulation distortion components 304 (ie difference frequency components resulting from the square law detection process) which all fall within the unused low frequency bandwidth corresponding with the vacant optical bandwidth $W_2$.

Figure 3B:
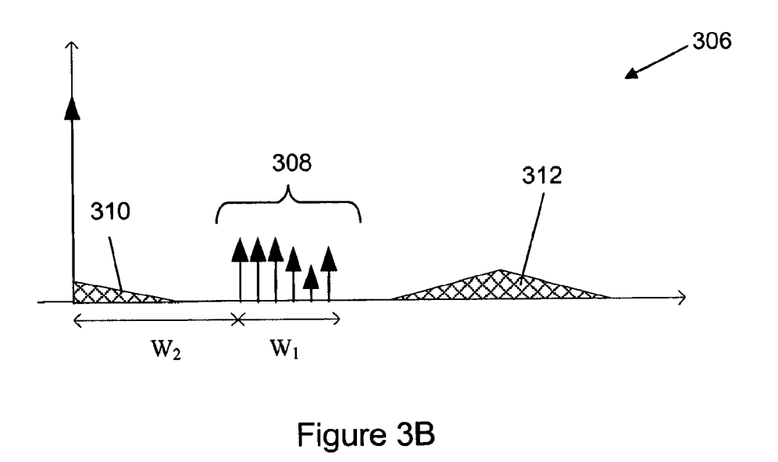

The received electrical signal spectrum 306 corresponding with DSB optical spectrum 212 includes the information-bearing OFDM subcarriers 308, and lower and upper intermodulation distortion products 310, 312, all of which again fall outside the signal bandwidth W, corresponding with optical bandwidth W. However, in this case accumulated phase differences between the upper and lower sidebands 216a, 216b result in differing degrees of constructive/destructive interference in the received OFDM subcarriers 308, such that some subcarriers will experience fading or attenuation. In principal, this effect, which is a result of chromatic dispersion in the transmission fibre 106, may be entirely compensated by a suitable amplitude adjustment of the faded subcarriers, however in practice heavily faded subcarriers may have limited or zero information-carrying capacity, due to a corresponding poor signal-to-noise ratio (SNR). Accordingly, OSSB transmission is preferable to DSB transmission.

Figure 3C:
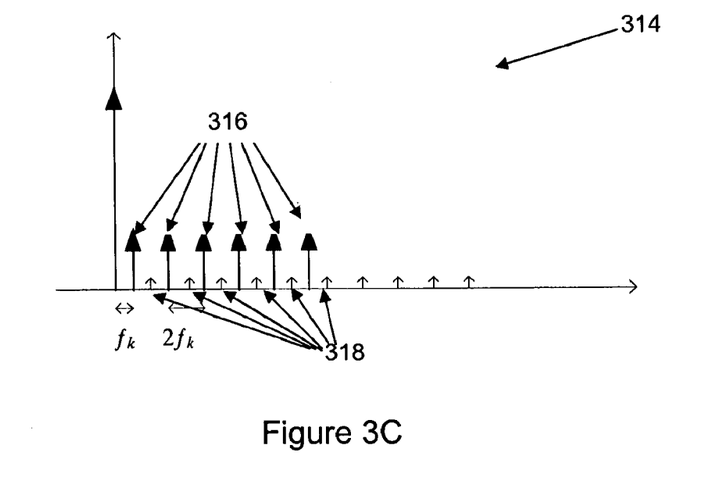

Finally, the electrical spectrum 314 corresponds with the OSSB spectrum 222. Information-bearing subcarriers 316 are "interleaved" with intermodulation distortion components 318, all of which fall on the unused intervening frequencies. Although not shown in the drawings, the corresponding DSB implementation experiences attenuation/fading effects similar to those illustrated in FIG. 3B.

As explained above, particularly with reference to FIGS. 2 and 3, the selection of the transmitted frequency spectrum enables the effects of square law detection in direct-detection receivers, and in particular the undesirable effects of intermodulation distortion, to be avoided. The present invention, in its various embodiments, also seeks to mitigate or eliminate the nonlinear characteristics of the optical transmitter 112. This is achieved by a nonlinear predistortion 110, which is substantially an inverse of the nonlinear characteristic of the optical transmitter, whereby the combination of predistortion and modulation results in a substantially linear relationship between the signal output from the signal generator 108 and the optical field amplitude generated at the output 112b of the transmitter 112. The precise nature of the predistortion applied depends upon the details of the optical transmitter 112, and in the embodiment illustrated in FIG. 1, more particularly upon the characteristics of the optical modulator 114. Exemplary cases are described below with reference to FIGS. 4, 5 and 6.

Figures 4, 5A, 5B, 5C:
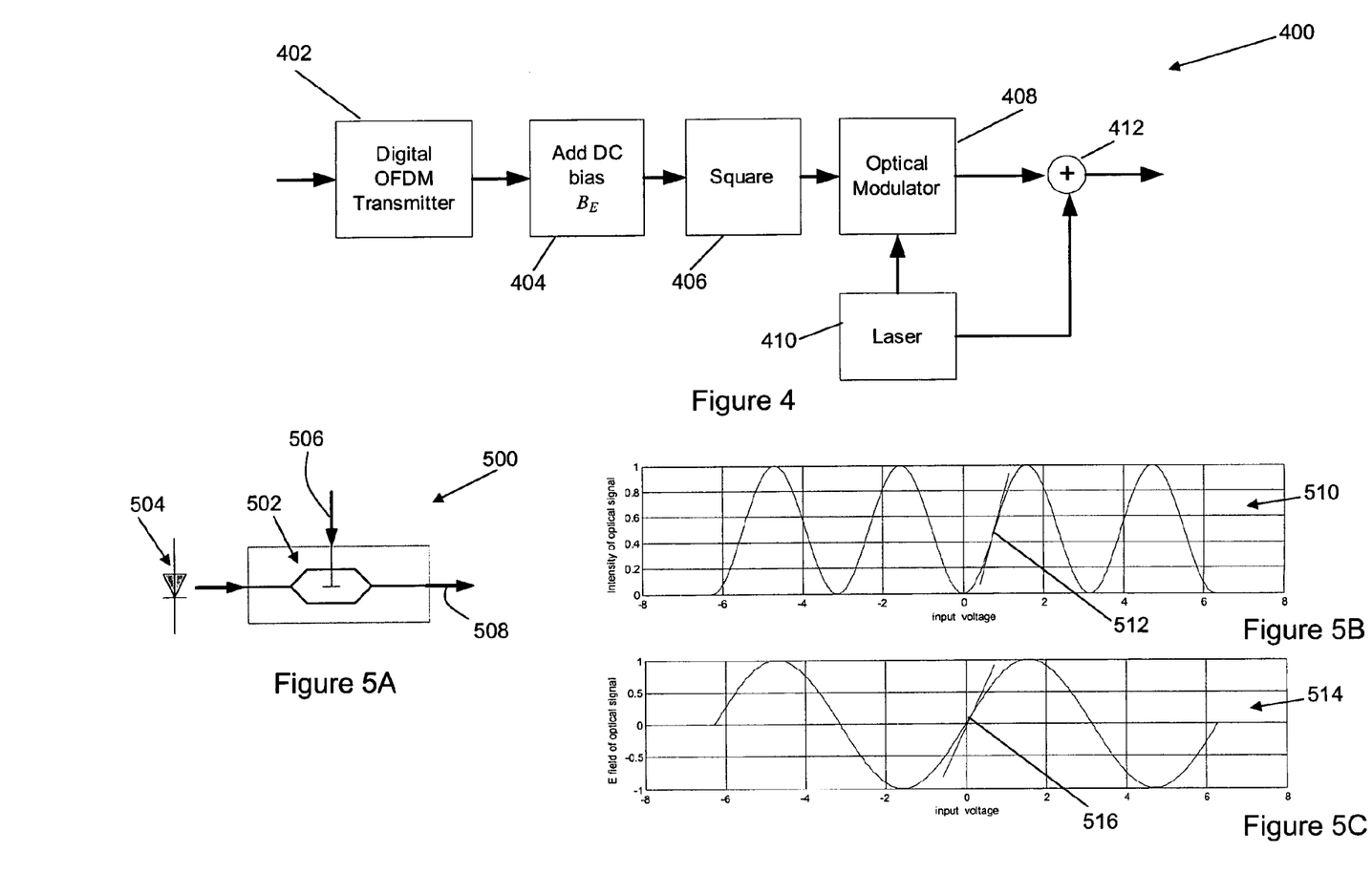
FIG. 4 illustrates a schematic model of signal generation and transmission apparatus according to an idealised embodiment of the invention.
FIGS. 5A, 5B and 5C illustrate a Mach-Zehnder modulator and corresponding optical intensity and field transfer characteristics.

FIG. 4 shows a schematic model of signal generation and transmission apparatus 400 according to an idealised embodiment of the invention, wherein the optical modulator 408 is a perfect linear intensity modulator, ie the modulation applied to the optical carrier results in output optical intensity that is directly proportional to the applied electrical drive signal.

More particularly, the idealised apparatus 400 includes digital OFDM transmitter 402, configured to compose a signal having a suitable frequency spectrum, such as those described previously with reference to FIGS. 2 and 3. The output of the signal generator 402 is a bipolar electrical signal (ie a signal having both positive and negative amplitude excursions). The predistortion consists of the operations represented by the blocks 404 and 406, which are respectively the addition of a DC bias or offset BE and a squaring operation which is intended to invert the effective "square root" relationship of the optical intensity modulator 408 between the applied electrical input field and output optical field amplitude. The DC bias 404 is required to ensure that the input to the squaring operation 406 is a unipolar (eg always positive) signal, to resolve the ambiguity resulting from the fact that there are two values (positive and negative) of the square root of a positive real number. The optical modulator 408 modulates an optical carrier generated by laser 410 with the predistorted signal output from the squaring operation 406, to produce a corresponding optical field having an amplitude that is ideally linearly related to the output of the signal generator 402. If necessary (ie if there is no optical carrier component in the output of the optical modulator 408, or if the carrier component is non-optimal) a portion of the unmodulated output of the laser 410 may be tapped-off, for example using an optical splitter, and coherently combined with the output of the optical modulator 408, as indicated by the summing junction 412. As will be appreciated, it is desirable for the transmitted optical signal to include an optical carrier component, as shown in the optical spectra of FIG. 2, in order to ensure correct reconstruction of the original information-bearing transmitted signal components in the electrical domain following direct detection of the received optical signal.

FIG. 5A illustrates schematically the structure of a practical Mach-Zehnder interference (MZI) modulator 500. As known in the art, an MZI modulator is based upon an integrated dual-path Mach-Zehnder waveguide structure 502, having an optical field, such as generated by a semiconductor laser diode 504, applied at an input thereof. The MZI waveguides are formed in a material, such as lithium niobate, which exhibits an electro-optic effect whereby the application of an electric field across a region of the waveguide results in a change in refractive index, which causes a phase shift in any optical field propagating therethrough. An electrical input 506 is provided for driving the modulator with an electric signal, and the resulting phase shifts in the optical field generated by source 504 and propagating through the Mach-Zehnder structure 502 cause interference at the modulator output 508, whereby the optical field is modulated in accordance with the electrical input signal.

The MZI structure inherently exhibits a sinusoidal transfer characteristic between the electrical input signal and the corresponding optical output signal. The intensity transfer function 510 is illustrated in FIG. 5B, while the corresponding field amplitude characteristic 514 is illustrated in FIG. 5C. MZI modulators are conventionally operated as intensity modulators, whereby the device is operated at the so-called "quadrature bias point" 512, whereby variations in the input electrical signal voltage around a corresponding mean value result in associated increases and decreases in output optical intensity. The relationship between input electrical signal amplitude, and output optical field amplitude, is nonlinear, due firstly to the inherent sinusoidal characteristic of the modulator 500, and further to the nonlinear relationship, already discussed, between optical intensity and optical field amplitude. While an MZI intensity modulator may be linearised, in accordance with the general principles described above in relation to FIG. 4, according to preferred embodiments of the present invention the modulator is instead operated around the null point 516, which advantageously enables both positive and negative (ie bipolar) modulation of the optical field amplitude, as illustrated in FIG. 5C. A predistortion is applied to the driving input signal voltage corresponding with the sinusoidal transfer characteristic 514, in order to produce an overall linear relationship between the information-bearing signal composed by the signal generator 108, and the amplitude of the resulting output optical field.

A single input MZI modulator, whether operated at the quadrature bias point or the null point, produces a DSB optical output signal. As previously described, particularly with reference to FIG. 3B, it is desirable, if possible, to generate a transmitted optical signal having only a single optical sideband, in order to avoid the presence of frequency-dependent attenuation, or nulls, in the received RF spectrum. One method for generating a suitable OSSB signal is simply to remove one sideband of the DSB signal using an optical filter. This, however, may be an undesirable approach in wavelength division multiplexed (WDM) systems, in which tunable optical sources may be employed in order to provide optical transmitters capable of generating transmitted signals at a variety of different wavelengths. The use of optical filters to remove sidebands from such signals is then complicated by the need for the filters also to be tunable. Since this may not be practical, or cost-effective, it would be preferable to generate an OSSB signal directly using an appropriate optical modulator. Once type of modulator which is capable of achieving this desirable result is the IQ modulator, illustrated schematically in FIG. 6. The IQ modulator 600 includes a "nested" Mach-Zehnder interferometric waveguide structure 602, which consists of two arms, each of which contains further Mach-Zehnder structures 604, 606. A fixed 90 degree phase-shift 608 is provided in one arm of the enclosing Mach-Zehnder structure. An optical source 610 provides an input unmodulated optical field to the modulator 600, and the corresponding optical fields propagating in each of the two main paths of the interferometer 602 are separately modulated in the structures 604, 606 via electrical input ports 612, 614 respectively. The resulting modulated fields are recombined at the optical output 618, with the fixed phase shift 608 ensuring that this combination occurs in quadrature, such that the separate electrical modulating signals applied at the input 612, 614 modulate the quadrature and in-phase components of the optical signal respectively. Conveniently, the required in-phase and quadrature components correspond simply with the respective real and imaginary paths of the values output from a complex-valued signal generator 108. As will be appreciated by those skilled in the art of digital signal processing, a complex-valued baseband signal having a single (eg positive frequency) sideband is readily generated from any real-valued signal by computing a corresponding sequence of imaginary components via the Hilbert transform. In the particular case of a digital OFDM transmitter, the same result may be achieved directly, and computationally efficiently, using a complex-valued inverse FFT, with the inputs corresponding to the undesired frequency sideband set permanently to zero.

Figure 6:
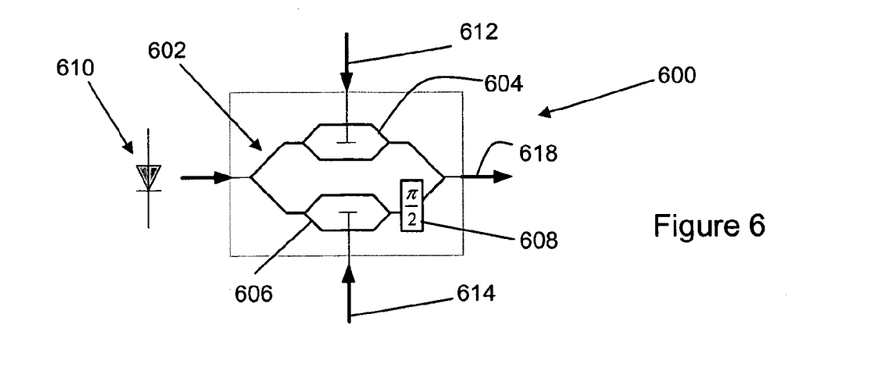
FIG. 6 illustrates an IQ modulator.

Accordingly, an IQ modulator such as the MZ IQ modulator 600, may be utilised to produce directly an OSSB output signal. Each of the two electrical signal inputs, ie the in-phase input 614 and quadrature input 612, should be predistorted to account for the overall nonlinearity of the modulator structure 602. This is a relatively straightforward matter, and the nonlinear relationship between input electrical signal amplitude and in-phase and quadrature optical output field amplitude is readily obtained, for example by theoretical, experimental or simulation means, whereby the appropriate inverse predistortion characteristic may be directly computed or tabulated.

Figure 7A:
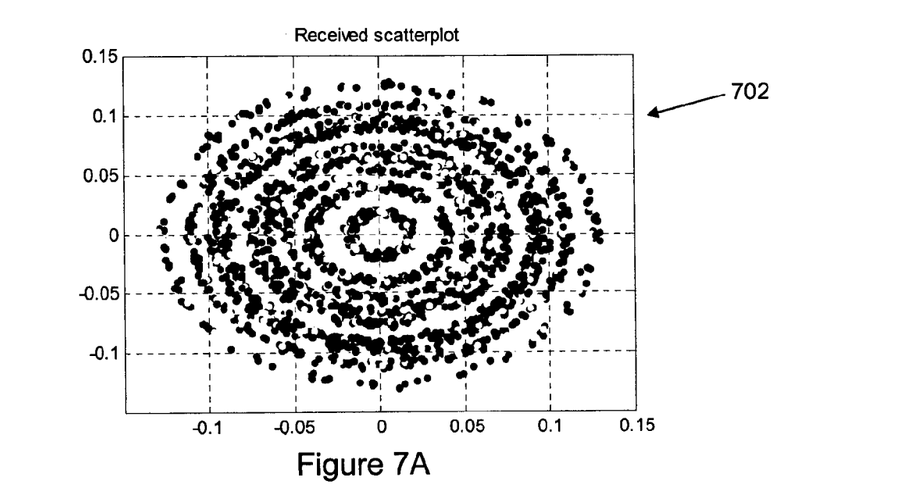
FIGS. 7A and 7B show received and equalised scatterplots (constellation patterns) obtained from simulations of one embodiment of the invention.
Figure 7B:
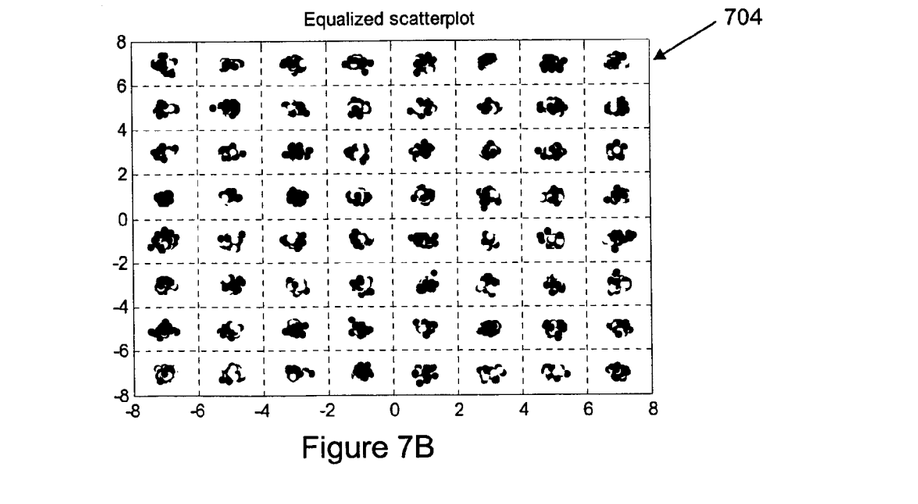
Figure 8A:
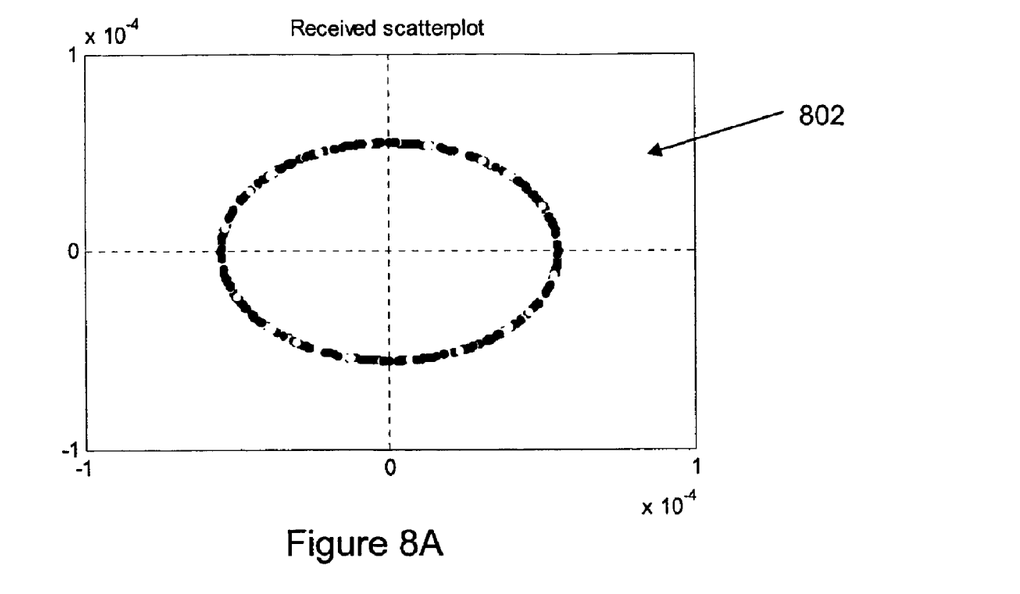
FIGS. 8A and 8B show received and equalised scatterplots (constellation patterns) obtained from simulations of another embodiment of the invention.
Figure 8B:
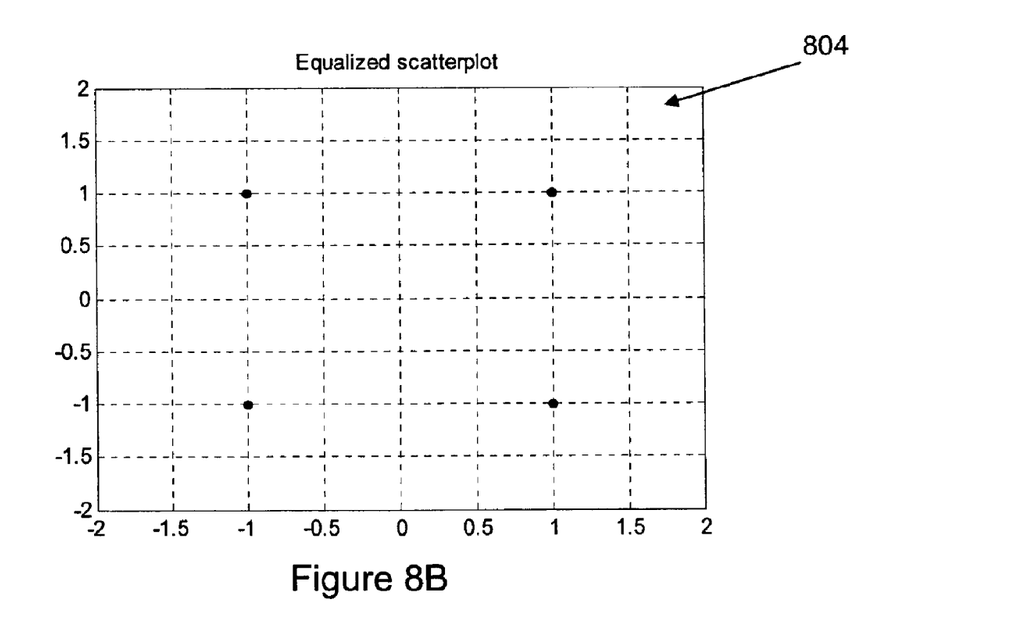
Figure 9:
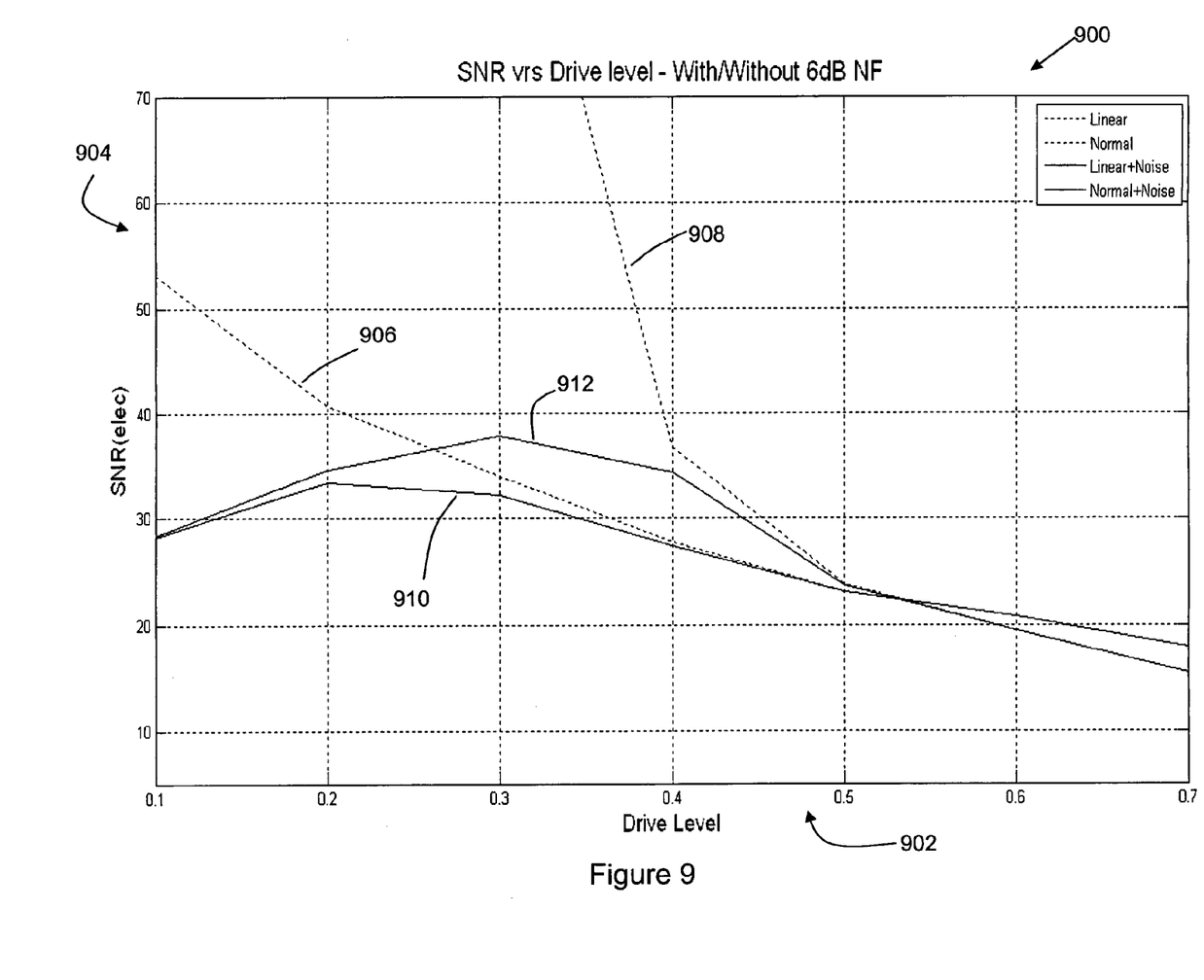
FIG. 9 is a graph comparing received signal-to-noise ratio versus modulation drive level between a transmitter which does not incorporate predistortion, and an exemplary transmitter operated in accordance with the present invention.

In order to verify the effectiveness of various embodiments of the invention, a number computer simulations have been performed, some results of which being illustrated in FIGS. 7, 8 and 9. In all cases, the simulated systems generally correspond with the exemplary system 100 of FIG. 1, utilising OFDM techniques for composition of the information-bearing signal, and a single-tap equaliser 128 in the receiver 124 in order to compensate for the effect of chromatic dispersion within the optical fibre link 106. The simulated systems employ IQ modulators, of the type 602 depicted in FIG. 6, in order to directly generate a suitable OSSB transmitted optical signal. Corresponding predistortion is performed digitally, based upon simulated measurements of the nonlinear response of the optical modulator.

FIG. 7 (comprising FIGS. 7A and 7B) shows the results of a first simulation, utilising OFDM signals having 64QAM encoding and modulation. The optical link 106 in this simulation includes five spans of dispersive optical fibre, each of which is 80 km in length (giving a total of 400 km transmission), and with optical amplifiers disposed therebetween, and contributing optical noise. The total bit rate transmitted is 15 Gb/s, within a bandwidth W of 2.5 GHz, within a single optical sideband occupying the band between 2.5 GHz and 5 GHz above the optical carrier frequency. The total bit rate of 15 Gb/s is selected to allow for information transmission at 10 Gb/s, along with sufficient additional capacity to accommodate OFDM overheads (such as cyclic prefix), as well as for error correction coding if desired.

The received scatterplot (ie constellation diagram) 702 without chromatic dispersion equalisation is shown in FIG. 7A. The equalised scatterplot, ie with the single tap equaliser 128 in operation, is shown in the diagram 704 of FIG. 7B. As can clearly be seen, the effect of chromatic dispersion is to rotate the phase of the QAM complex values representing the data symbols, which effectively "smears" the points of the constellation around a series of concentric circles. These phase shifts may be completely reversed using a single tap equaliser 128, to recover the original constellation points, as in the scatterplot 704. It is apparent that substantially error-free recovery of the original transmitted data symbols is possible within the simulated embodiment of the invention.

The further results depicted in FIG. 8 (comprising FIGS. 8A and 8B) correspond with a more robust system, utilising only 4QAM at a total information bit rate of 5 Gb/s, and with reduced optical noise. Again, the unequalised received scatterpoint 802 shows a characteristic circular "smear" of received symbol values, which may be completely equalised using the single tap equaliser 128, to recover the original 4QAM symbol values, illustrated in the scatterplot 804 of FIG. 8B.

The graph 900 shown in FIG. 9 summarises a series of results corresponding with the simulated system used to produce the results 702, 704 of FIG. 7. The graph 900 shows the relationship between the modulator drive level (on the x-axis 902) and the resulting received electrical signal-to-noise ratio (on the y-axis 904) at the receiver. Four cases are shown, being systems with and without optical noise, and with or without predistortion linearisation. The curve 908 corresponds with a system linearised in accordance with an embodiment of the present invention, but without optical noise, while the curve 906 represents the same noiseless system, but without predistortion. At high drive levels, there is little difference between the two sets of results, which reflects the fact that linearisation of the modulator is restricted by the fundamental minimum and maximum output levels available, which necessarily require (nonlinear) limitation of the driving electrical signal and/or the modulated optical output signal. However, at lower drive levels, where limitation or "clipping" is not a significant factor, the linearised system enables an extremely high received signal-to-noise ratio to be achieved, reflecting the fact that intermodulation distortion resulting from modulator nonlinearity is substantially eliminated.

The curves 910, 912 represent the more realistic case in which optical noise is also included in these simulations, the curve 910 corresponding with a system without linearisation, and the curve 912 with a system linearised in accordance with an embodiment of the present invention. Once again, at high drive levels intermodulation distortion caused by limitation or clipping of the transmitted signals prevents significant improvements to be achieved by linearising the optical transmitter. However, at intermediate drive levels (eg 20 to 50 percent), the system linearised according to an embodiment of the invention achieves significantly improved performance, due to the reduction of intermodulation distortion occurring as a result of transmitter nonlinearity, as compared with the corresponding system without predistortion. At very low drive levels the optical noise dominates over the transmitter-induced intermodulation distortion, and accordingly there is less improvement achieved by using the linearised system. However, the maximum achievable received signal-to-noise ratio for the linearised system, which occurs at a drive level of about 30 percent, is approximately 4.5 dB greater than that for the nonlinearised system, which occurs at a drive level of about 20 percent. As will be appreciated, this 4.5 dB improvement in received signal-to-noise ratio which may be achieved in accordance with the present invention is extremely significant, and represents a substantial increase in the achievable transmission capacity and/or distance.

It should be noted that the difference between the two curves 910, 912 is due solely to linearization of the transmitter. In both cases, OSSB transmission is used, in combination with a signal composed such that its spectrum includes spectral components having the property that difference frequencies thereof do not substantially interfere with any of the desired information-bearing components. Even for the system without linearization, the received signal quality is generally improved over that which would be expected, for example, using a conventional DSB intensity modulated optical signal. It is therefore apparent that a system, apparatus or method embodying the spectral composition and OSSB transmission features described herein with reference to FIGS. 1 to 8 offers substantial advantages over prior art optical transmission techniques.

In particular, systems, methods and apparatus employing OFDM techniques for composition of an information-bearing electrical signal, and in particular those producing signals utilizing odd-numbered subcarriers, as illustrated in FIG. 2C, are believed to be advantageous in achieving results comparable to those obtainable when linearization is additionally employed.

While particular embodiments of the present invention have been described herein, by way of example, it will be understood that the invention is not so limited, but rather that the scope of the invention is defined by the claims appended hereto.

The invention claimed is:

1. A method of transmitting information in an optical transmission system, comprising:
    an optical transmitter having at least one electrical input and an optical output arranged such that a signal applied at said electrical input is modulated onto an optical carrier and emitted at said optical output, and wherein there is a predetermined nonlinear relationship between input electrical signal amplitude and corresponding output optical field amplitude;
    an optical receiver having an optical input and an electrical output, and wherein there is a square law relationship between amplitude of an optical field applied to the optical input and a corresponding electrical output signal; and
    an optical channel disposed between the optical transmitter and the optical receiver,
    wherein the method comprises the steps of:
    composing an electrical orthogonal frequency division multiplexed (OFDM) signal bearing said information, the signal having a corresponding frequency spectrum comprising a plurality of spectral components having the property that difference frequencies thereof do not substantially interfere with any of said spectral components;
    predistorting said signal in accordance with a predistortion characteristic comprising a squaring function, and which is substantially an inverse to said nonlinear relationship between input electrical signal amplitude and corresponding output optical field amplitude of the optical transmitter;
    applying the predistorted signal to the electrical input of the optical transmitter to generate a corresponding information-bearing signal at the optical output thereof; and
    transmitting the information-bearing optical signal over the optical channel along with an optical carrier component.

2. The method of claim 1 wherein the composing step is performed such that the signal occupies a continuous spectral band of bandwidth W having a minimum frequency $f_{min}$, wherein $f_{min}$ is greater than or equal to W.

3. The method of claim 1 wherein the composing step is performed such that the signal is modulated in a mutually orthogonal manner onto a plurality of frequency subcarriers, wherein each subcarrier is spaced from adjacent subcarriers by a frequency interval which is an integer multiple of a frequency $2f_0$, and the lowest frequency subcarrier is substantially located at a frequency which is an odd-numbered multiple of $f_0$.

4. The method of claim 1 wherein the optical transmitter comprises a nonlinear optical modulator, and the predistortion characteristic accounts for a nonlinear transfer characteristic of the optical modulator.

5. The method of claim 4 wherein the nonlinear transfer characteristic of the optical modulator is a sinusoid.

6. An apparatus for transmitting information via an optical channel to a remotely-located optical receiver, wherein said receiver has an optical input and an electrical output having a square law relationship between the amplitude of an optical field applied to the optical input and a corresponding electrical output signal, the apparatus comprising:
    an optical transmitter having at least one electrical input and an optical output arranged such that a signal applied at said electrical input is modulated onto an optical carrier emitted at said optical output, and wherein there is a predetermined nonlinear relationship between input electrical signal amplitude and corresponding output optical field amplitude;
    a signal generator configured to compose an electrical orthogonal frequency division multiplexed (OFDM) signal bearing said information, the signal having a corresponding frequency spectrum comprising a plurality of spectral components having the property that difference frequencies thereof do not substantially interfere with any of said spectral components; and
    predistortion means having a predistorted signal output, and which is configured to generate at said output a predistorted signal by applying to said composed signal a predistortion characteristic comprising a squaring function, and which is substantially an inverse to said nonlinear relationship between the input electrical signal amplitude and corresponding output optical field amplitude of the optical transmitter,
    wherein the predistorted signal output is operatively coupled to the electrical input of the optical transmitter, and the optical output of the optical transmitter is operatively coupled to the optical channel, such that an information-bearing optical signal is transmitted along with an optical carrier component via the optical channel.

7. The apparatus of claim 6 wherein the optical transmitter comprises a nonlinear modulator, and the predistortion means is configured to apply a predistortion characteristic which accounts for a nonlinear transfer characteristic of the optical modulator.

* * * * *